said rotation to be in a predetermined direction.

6. In a tire packaging device, the combination of means for holding a plurality of tires in a position to be banded together comprising a framework; twisting means for securing tie wires to said tires; and means comprising a roller carried by said frame work to facilitate the rotation of the tires around a common axis after the first banding operation.

7. In a tire packaging machine, the combination of means comprising a frame and a roller for holding a plurality of tires in position to be banded together; and means comprising a wire tying machine and an adjustable support for applying wires to said tires while so held.

8. In a tire packaging machine, the combination of means comprising a frame provided with an upright post and a roller for holding a plurality of tires in position to be banded together; and means comprising a wire tying machine and an adjustable support comprising lazy tongs for applying wires to said tires while so held.

9. In a wire packaging device the combination of means for holding a plurality of tires in a predetermined position; twisting means to secure a tie wire around said tires while so held; and means to aid in removing the tires after said wire has been secured in position.

10. In a tire packaging device, the combination of means for holding a plurality of tires to be banded together in a predetermined position; means to facilitate the rotation of said tires as a unit around a common axis during the banding operation; a wire tying machine adapted to band said tires together; and means to aid in ejecting the banded tires from the machine after the package is formed.

11. In a tire packaging device, the combination of means for holding a plurality of tires in a position to be banded together; means for applying and twisting tie wires to said tires; means to facilitate the rotation of the tires around a common axis after the first banding operation; and means to aid in ejecting the tires from the device after said tie wire has been applied.

12. In a tire packaging machine the combination of means to hold a plurality of tires in positions to be banded together comprising a pair of rollers and a pair of upright posts; means comprising a wire tying machine for banding said tires while so held; and an ejecting means for removing the banded tires.

13. In a tire packaging machine the combination of means to hold a plurality of tires in positions to be banded together comprising a pair of rollers and a pair of upright posts; means comprising a wire tying machine for banding said tires while so held; a pair of lazy tongs; adjustable connections between said wire tying machine and said lazy tongs; and an ejecting means for removing the banded tires.

14. In a tire packaging device, the combination of means for holding a plurality of tires in axial alinement; means for holding said tires in vertical positions; and a wire tying machine for banding said tires into a package.

15. In a tire packaging device, the combination of means for holding a plurality of tires in axial alinement; means for holding said tires in vertical positions; a wire tying machine for banding said tires into a package; and means to facilitate the removal of said package from the device.

16. In a tire packaging device, the combination of means for holding a plurality of tires in axial alinement preparatory to banding the same into a package; a wire twisting machine for banding said tires together; and means to facilitate the removal of said tires after the banding operation.

17. In a tire packaging device, the combination of means comprising upright posts and horizontally disposed rollers for holding a plurality of tires in axial alinement preparatory to banding the same into a package; a wire twisting machine for banding said tires together; and means to facilitate the removal of said tires after the banding operation.

18. In a tire packaging device, the combination of means for holding a plurality of tires in axial alinement preparatory to banding the same into a package; an adjustable wire twisting machine to tie said tires together; and means comprising a lever and a movable ejector operated by said lever to facilitate the removal of said tires after the banding operation.

19. In a tire packaging device, the combination of means comprising horizontal and vertical supports for holding a plurality of tires in axial alinement preparatory to banding the same into a package; an adjustable wire twisting machine to tie said tires together; and means comprising a movable ejector to facilitate the removal of said tires after the banding operation.

In testimony whereof I affix my signature.

LEROY F. HINTZ.

Sept. 2, 1924.
O. W. HOOPPAW
FASTENER
Filed April 18, 1919
1,507,377
4 Sheets-Sheet 1
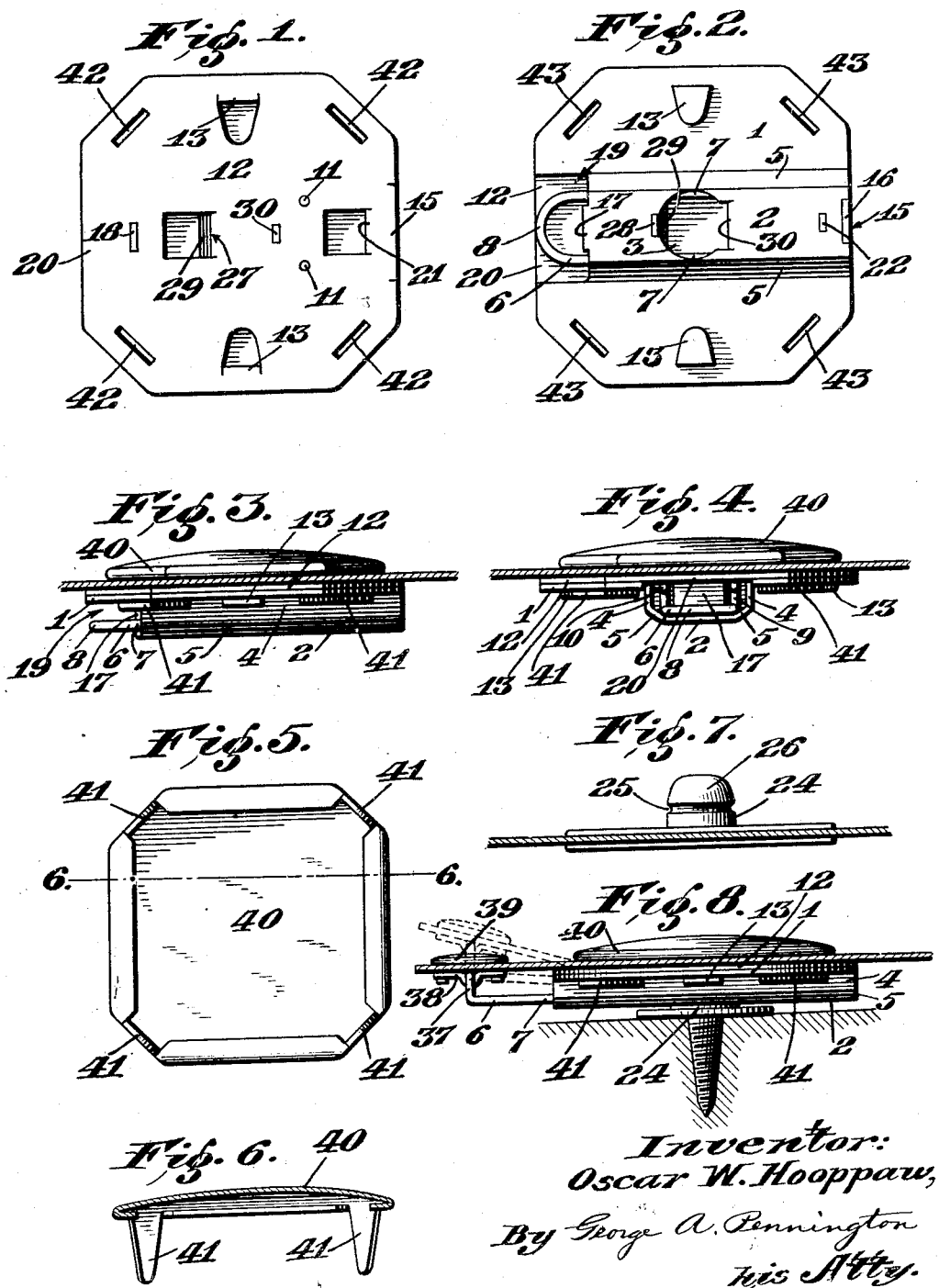

Sept. 2, 1924.  O. W. HOOPPAW  1,507,377
FASTENER
Filed April 18, 1919  4 Sheets-Sheet 2
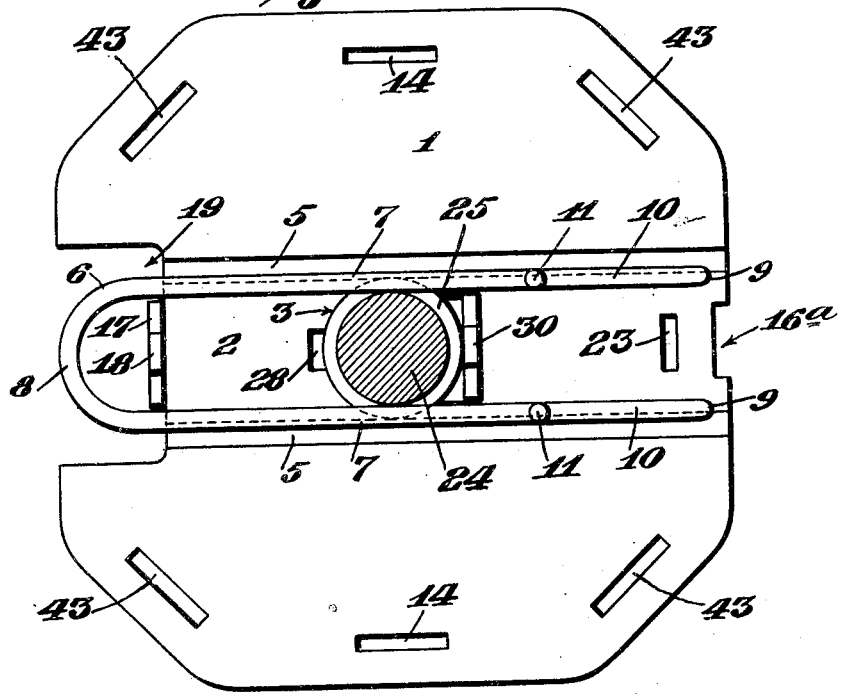
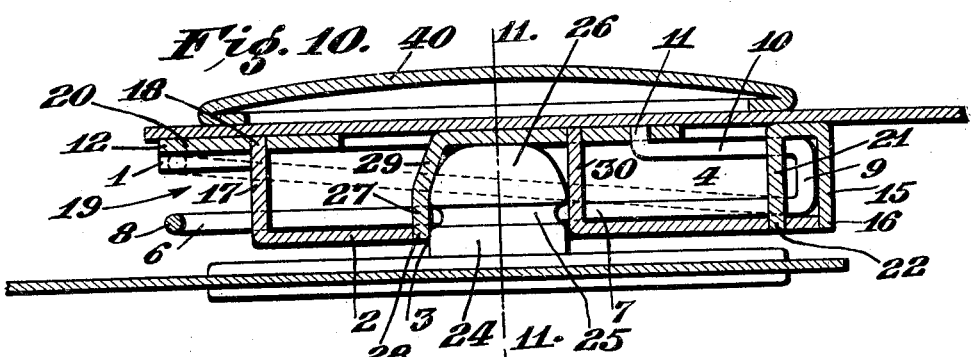
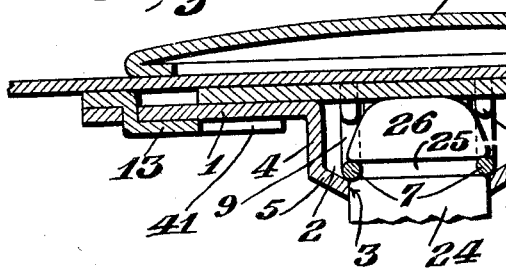
Inventor:
Oscar W. Hooppaw,
By George A. Pennington
his Atty.

Sept. 2, 1924.  O. W. HOOPPAW  1,507,377
FASTENER
Filed April 18, 1919  4 Sheets-Sheet 3

Inventor:
Oscar W. Hooppaw,
By George A. Pennington
his Atty.

Sept. 2, 1924.   O. W. HOOPPAW   1,507,377
FASTENER
Filed April 18, 1919    4 Sheets-Sheet 4
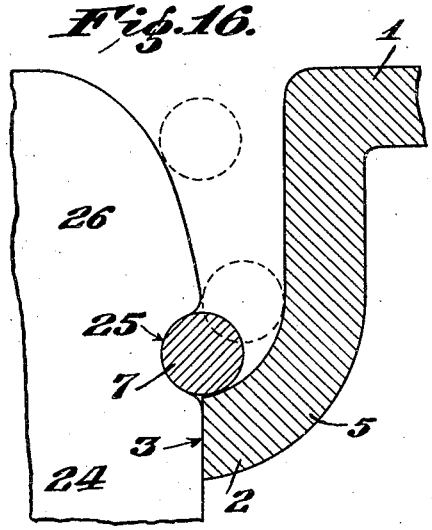
Fig. 16.
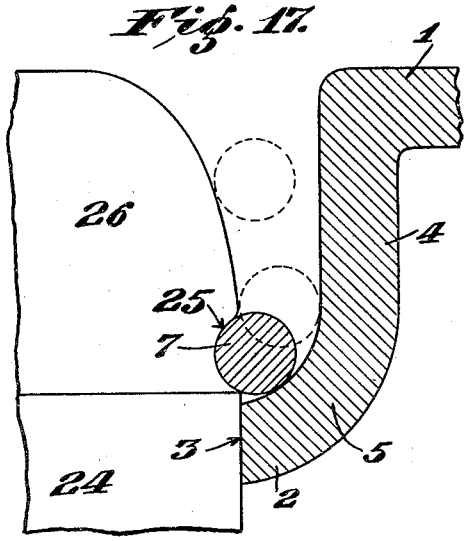
Fig. 17.
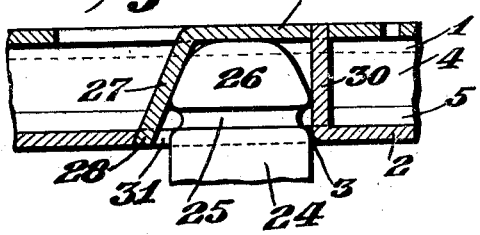
Fig. 18.
Fig. 19.
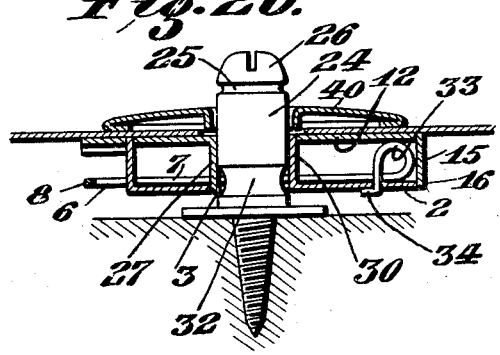
Fig. 20.
Fig. 21.
Inventor:
Oscar W. Hooppaw,
By George A. Pennington
his Atty.

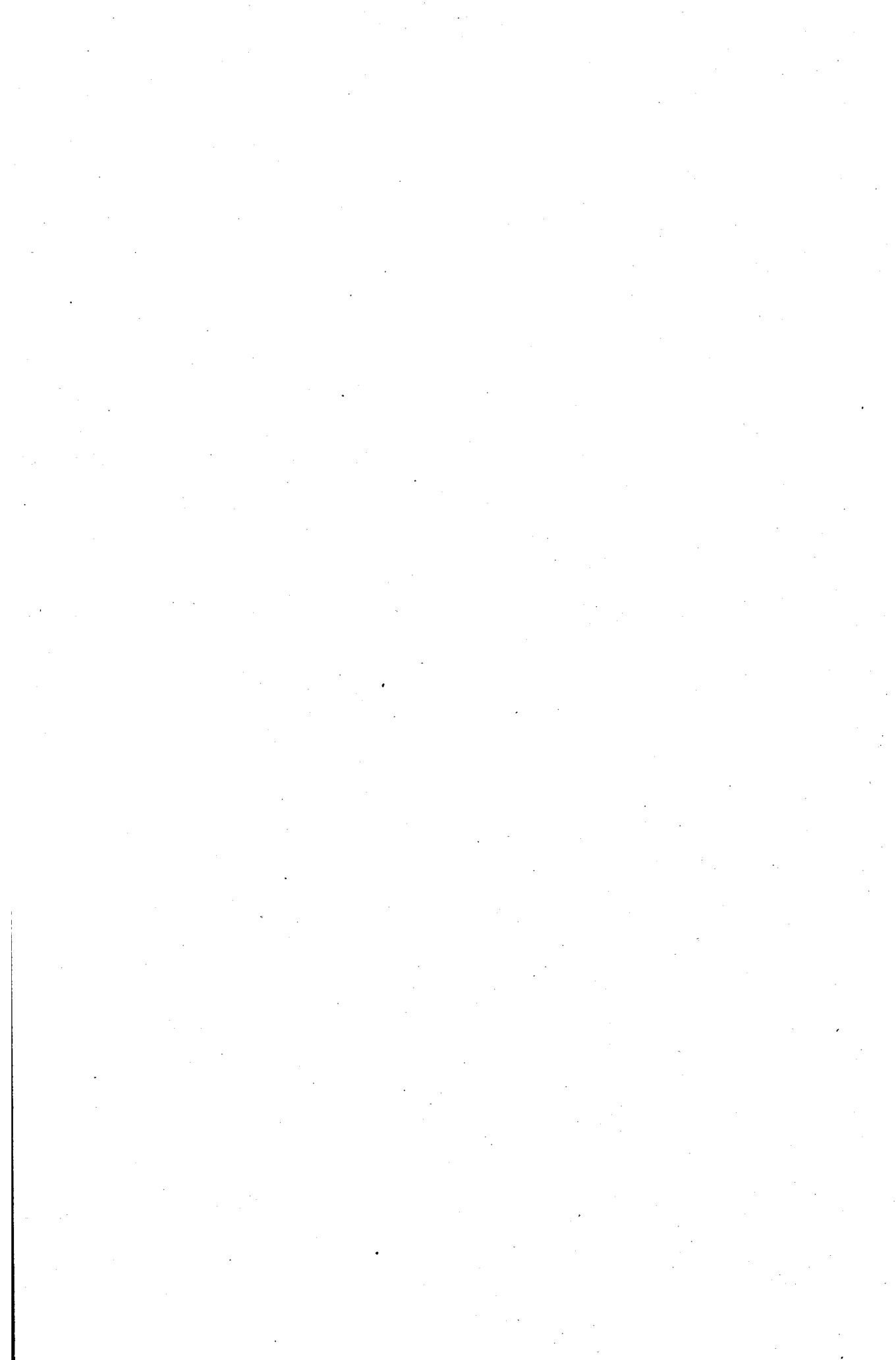

Patented Sept. 2, 1924.

1,507,377

UNITED STATES PATENT OFFICE.

OSCAR W. HOOPPAW, OF ST. LOUIS, MISSOURI, ASSIGNOR TO HOOPPAW MANUFACTURING COMPANY, OF ST. LOUIS, MISSOURI, A CORPORATION OF MISSOURI.

FASTENER.

Application filed April 18, 1919. Serial No. 291,027.

*To all whom it may concern:*

Be it known that I, OSCAR W. HOOPPAW, a citizen of the United States, residing in the city of St. Louis and State of Missouri, have invented a new and useful Improvement in Fasteners, of which the following is a specification.

This invention relates to clasps, fasteners or locks, and more particularly to a releasable, socket-and-stud, snap fastener, which is capable of various uses on both flexible and unyieldable materials, such as automobile and other vehicle curtains, furnishings and trimmings, garments, boots, shoes, leggins and other wearing apparel, and clasps, fasteners and locks in the general class of hardware.

One of the objects of the invention is to provide a simple, inexpensive, efficient and durable form of clasp, fastener or lock, the separable socket and stud members of which may be readily pressed into engagement, and, when so united, are locked securely to resist pressure or strain, tending to separate them, and yet are capable of being easily disengaged by the manual operation of the locking element without disturbing the normal engaging relation of the socket and stud members. Other objects and advantages to be attained will more fully appear in the following description.

The invention consists essentially in a novel construction, arrangement and correlation of the socket and stud members whereby they may be brought into a definite engaging relation in a right line and likewise separated, the socket member having a flexible or yieldable and preferably resilient member to interlock with the stud member and being normally supported on the socket member whereby to prevent separation of the united socket and stud members, and yet being releasable from its support and the stud member without initially tilting either the socket member or the stud member with respect to the other or in anywise necessitating any other preliminary relative movement between them, when it is desired to separate said socket and stud members. The invention further consists in the parts and in the combinations and arrangements of parts hereinafter described and finally pointed out with particularity in the appended claims.

In the accompanying drawings, wherein certain practical embodiments of the invention are illustrated,—

Figure 1 is a plan view of a clasp member, looking at the outer face of the cover or roof plate thereof;

Figure 2 is a similar view of the clasp member, looking at the outer face of the base or floor plate thereof;

Figure 3 is a view showing a section of material with the complete clasp member and attaching plate shown in side elevation;

Figure 4 is a view similar to Figure 3, but looking at a different side or what may be termed the front end of the clasp member;

Figure 5 is an inside face view of the attaching plate;

Figure 6 is a section on the line 6—6 of Figure 5;

Figure 7 is a view showing a section of material with one form of stud member attached thereto;

Figure 8 is a view illustrating a different way of applying the clasp member to a curtain or other flexible article;

Figure 9 is a view on an enlarged scale, being an inside face view of the base or floor plate and showing the stud member in cross section through the annularly grooved portion thereof and the spring member in its normal engaging relation to its support and the stud member;

Figure 10 is a section on the same enlarged scale and showing the socket or clasp member and the stud member united, the spring member being shown by full lines in its normal engaging relation and by dotted lines in the position to which it is initially moved as the stud member is pressed into the clasp member or when manually operated to release the stud member;

Figure 11 is a fragmentary section on the line 11—11 of Figure 10;

Figure 12:
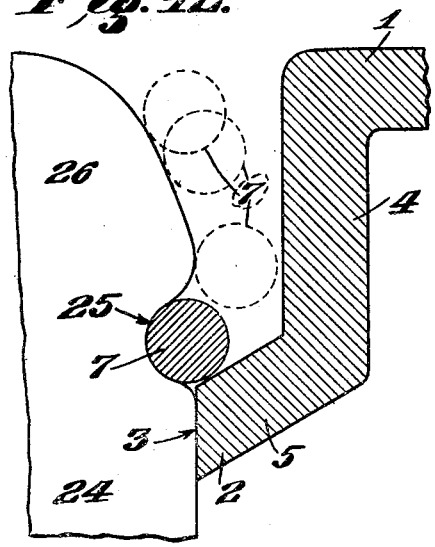
Figure 13:
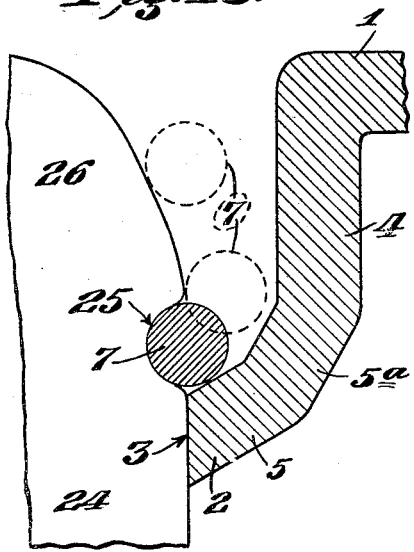
Figure 14:
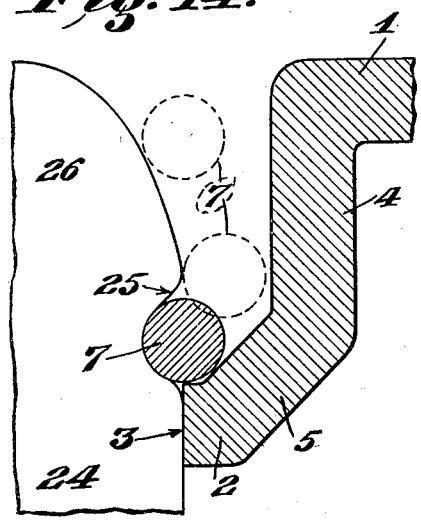
Figure 15:
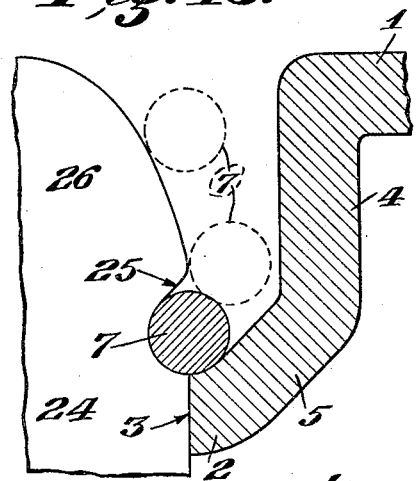

Figures 12 to 17, inclusive, are schematic views on a greatly enlarged scale, showing different modifications of the stud formation and the support for the spring member;

Figure 18 is a fragmentary section of the clasp member, showing a modification of the support and guide in the socket which receives the stud member;

Figure 19 is a fragmentary outer face view of the base or floor plate, showing the socket opening and support of the modification shown in Figure 18;

Figure 20 is a section showing a further modification of the clasp member, spring member and stud member; and Figure 21 is a fragmentary view showing a still further modification of the spring member.

Referring now to the drawings, and more particularly to Figures 1 to 11, inclusive, thereof, the numeral 1 designates the base or floor plate of the clasp or socket member. This plate is formed with an elongated depression or channel portion 2 at the middle thereof, and it has a generally circular aperture or socket opening 3 therein for the reception of the stud member as will be later described.

The side walls 4 of the channel portion 2 are preferably straight and at right angles to the body of the plate 1, but the bottom or floor thereof is inclined or sloped outward and upward, as at 5, on opposite sides of the opening 3 to the corner or place of mergence with the side walls. The inclination or slope may be either in a straight or a curved line and varied in the degree of its pitch, as will be presently more fully pointed out.

Within the channel portion 2 is placed a spring member 6 having two parallel legs 7 which rest normally lengthwise against the inclined shoulders or supports provided by the portions 5, and either directly in the crotch or corner where said portions 5 merge with the flat portion of the floor or closely adjacent thereto, but, in any case, so that portions of the legs 7 cross and overhang the opening 3, as parallel chords, on opposite sides thereof.

The spring member 6 is preferably formed of a single piece of resilient wire bent or looped at its middle into substantially U-shape to constitute a handle portion 8 and provide the parallel legs 7. The end portions of the wire are turned up from the floor at the end of the channel 2, as at 9, thence rebent and extended forwardly, as at 10, under a cover or roof plate to be presently described, and the extreme end portions 11 being turned outward and engaged in apertures provided therefor in the cover or roof plate.

The cover or roof plate, designated by the numeral 12, is preferably of the same size and shape as the base or floor plate 1, and said plates may be polygonal, round or oval, as desirable. The plates may be secured together in any desirable manner, but, as shown, the plate 12 has tongues 13 struck up therefrom, which are inserted through correspondingly located slots 14 in the plate 1 and then clinched against the outer face of said plate 1.

One end of the channel 2 may be closed by turning down a leaf 15 from the margin of the roof plate 12 of a size and shape corresponding to the contour of the walls and floor of the channel; and, preferably, the end portion 16 of the leaf 15 is mortised into a recess 16ᵃ provided therefor in the floor. The opposite end of the channel 2 may be partially closed by turning up a leaf 17 from the middle of the floor and mortising the end portion 18 thereof into a slot provided therefor in the roof. In some cases, the channel portion of the floor plate will be cut away, as at 19, adjacent to the handle portion 8 of the spring member so as to have the said portion 8 free to be engaged by the finger of the operator, and in which case the overhanging portion 20 of the roof plate 12 serves as a stop to limit the travel of the spring member as well as a guard to protect the said projecting portion of the spring member against injury.

The leaf 17 is of a width just a little less than the normal distance between the parallel legs 7 of the spring member, so that the latter are permitted a free up and down movement and at the same time the spring member is afforded a guide which maintains it in proper cooperative relation to the socket opening 3.

Near the leaf 15, another leaf 21 may be either turned down from the roof plate, as shown, or up from the floor, as desirable, and have its end portion 22 mortised into a slot 23 in the opposite plate. This last mentioned leaf should fit snugly between the legs 7 and the parallel rebent portions 10 so as to prevent convergence or relative inward movement of said parts at that place.

The stud member, designated by the numeral 24, preferably, should be of a diameter to freely enter the socket opening 3, though rather snugly; but considerable looseness may be allowed without detracting from the efficiency of the device owing to the character of the supporting shoulders for the spring member.

The portion of the stud member which enters the socket is provided with an annular groove 25 to receive the legs 7 of the spring member which extend chordwise across the opposite sides of the socket opening 3 in the floor plate 1, while the end or head portion 26 is tapered or rounded off so as to enter between the legs 7 of the spring member with wedge effect. Consequently, when the stud is pressed into the socket, the head portion 26 will first engage the legs 7 of the spring member, thereby lifting them from the floor, and, as the legs 7 are thus relieved of their lateral support, the entering, wedge-like, head of the stud member bows them outward, whereupon, owing to their own resiliency, they snap back to normal position as soon as the annular groove 25 of the stud member is brought into position to receive them.

Being thus engaged with the stud and resting against the inclined or sloping shoulders 5, the spring member securely holds the clasp or socket member and the stud member united, as any force applied tending to separate the stud and socket members only causes the legs 7 of the spring member to more tightly grip the stud, because the tendency of said legs 7 is to move down and not up the inclined shoulders 5. On the other hand, if it is desired to separate the stud and socket members, the looped or handle portion 8 of the spring member need only be moved towards the roof plate 12 of the socket member, whereupon the legs 7 will be lifted from the floor plate and ride out of the groove 25 in the stud member, being free to spread in the region of the stud member as they ride up the inclined shoulders 5. After clearing the groove in the stud member, said legs 7, by their own resiliency, contract upon the tapered portion of the head of the stud member and tend thereby to move the stud member out of the socket.

By having a stop, which, as shown, may be the roof plate 12, or, obviously, providing a special stop of some sort to arrest the free portion of the spring member, a limitation is placed upon the travel of the wire in the actuation of the member, in both the operation of uniting the stud with the socket member and separating them.

The form of the lateral retaining supports for the legs 7 of the spring member may be varied considerably. Referring, therefore, to Figures 12 to 15, inclusive, it will be noted that the operative surfaces of the shoulders 5 are inclined planes, which are not limited to one certain angle. For example, in Figures 12 and 13 the angle of the effective or operative shoulder is approximately thirty degrees, while in Figures 14 and 15 it is approximately forty-five degrees. Furthermore, it is not necessary to continue the inclined portion of the floor all the way to the side walls 4 at the same angle, but, beyond the effective working surface, the angularity may be changed, as at 5ª in Figure 13. So, too, in some cases, the surface may be concaved or rounded out as shown in Figures 16 and 17.

To afford a bearing surface or support for the engagement of the head of the stud member when inserted into the socket member, so as to prevent a relative canting or tilting movement of the socket member and stud member which might cause them to bind and hang when the spring member is lifted in the operation of separating them, an abutment 27 is provided adjacent to the socket opening 3 and on the side thereof towards the handle portion 8 of the spring member. This abutment may be conveniently provided by turning a part of the roof plate 12 down between the legs 7 of the spring member and mortising its end portion into the floor plate 1, as at 28, and with its inner face tangential to the circle of the opening 3.

As shown in Figures 1, 2 and 10, the part 27 is disposed perpendicularly to the floor up to about where the head of the stud member begins to taper, and thence is inclined, as at 29, correspondingly to the angularity of the taper. In this way the stud member is held in perpendicular engaging relation to the socket member when force is applied tending to move the socket member outward at the side adjacent to the handle end of the spring member or inward at the opposite side, or by the act of lifting the spring member from the floor. Otherwise, a tilting action of the socket member on the stud member might occur, which would cause the diametrically opposite edge portions of the floor plate at the opening 3 to bind on the stud member, so as to hinder the operation of the spring member and separation of the stud and socket members.

It is further desirable to turn up a leaf 30 from the floor plate 1, tangential with the circle of the opening 3, and on the side thereof opposite to said member 27. This member 30 should extend at least to a point above the annular groove 25 in the stud member, but, as shown, may be carried all the way to the roof plate 12 and mortised therein.

The opposed members 27 and 30 serve not only to prevent tilting of the socket member on the stud member, but to guide the stud member into and out of the socket so as to prevent the annularly grooved portion 25 of the stud member from catching on the edge of the floor plate 1 at the opening 3, while the legs 7 of the spring member perform the same function transversely thereof.

In some cases, the abutment or supporting member 27 may be inclined throughout its entire length, as shown in Figures 18 and 19, in which event, the opening 3 will be correspondingly elongated, as at 31. This will permit a relative tilting movement of the socket and stud members, but only when they are partially separated. That is, either just before the stud member has been moved endwise into final engaging relation with the socket member whereby the legs 7 of the spring member may enter the annular groove 25 of the stud member, or, after the legs 7 have been disengaged from the groove in the stud member and said stud member has been moved some distance outward in the socket.

In practice, the roof plate 12 is ordinarily imperforate above the socket opening 3 of the floor plate 1, and the end of the stud member, in most cases, will be made to abut the roof plate as shown. This affords a limiting stop and prevents end play of the stud member when united with the socket member and the spring member is engaged in the annular groove of the stud member; but, obviously, in some cases, the stud member may terminate short of the roof plate, and the same result may be obtained by providing the stud member with an annular shoulder just outside of the socket member so as to engage the floor plate 1 about the opening 3. In other cases, where it is necessary to fasten two or more curtains or objects on a single stud, the roof plate 12 of the socket member is provided with an opening alined with the socket opening 3 of the floor plate, as shown in Figure 20, and both the abutment or support 27 and the member 30 are disposed parallel throughout with the axis of the socket, so that the stud may be projected entirely through the socket member.

In the last noted cases, the stud member is provided with an annular groove or grooves 32 in proper position for the reception of the legs 7 of the spring member. These grooves 32 may be of a tranverse concavity on a radius much greater than that of the regular groove 25 which is provided adjacent to the head 26, as said grooves 32 need only be provided to accommodate said spring member and permit it to assume its normal position on the floor plate, because the outermost socket member whose spring member engages the groove 25 adjacent to the head 26 of the stud member may be alone depended upon to retain the others on the stud member. However, if it is so desired, each socket member may be separately locked to the stud, and in that case the grooves 32 may be made in exact duplication of the groove 25.

In practice, the depth of the groove 25 will be determined principally by the character of the supporting shoulder for the leg of the spring member and the pitch or degree of slope thereof. The transverse contour of the groove may also be varied. For example, in the forms illustrated in Figures 12, 13, 16 and 17, the contours are in curved lines throughout, while in Figures 14 and 15 a portion of the groove is flat and parallel with the cooperating face of the inclined supporting shoulder 5.

It is also to be here noted that the form of the spring member 6 may be varied considerably without departing from the spirit of the invention. One example of such variation is shown in Figure 20, wherein the end portions of the legs 7 are formed with single coils or loops 33, and thence extended through the floor plate 1 with their extreme end portions 34 turned inward so as to hook against the outer face of said floor plate; while in Figure 21 the coils or loops 35 are doubled and the end portions 36 are carried inward under the roof plate 12 and engaged in apertures therein as shown in Figure 10.

In some cases, and particularly where the fastener is used on automobile and other vehicle curtains and like flexible parts, the handle end of the spring member may be attached to the free marginal portion or flap, so that the disengagement of the socket and stud members may be effected by simply lifting the said marginal portion or flap of the curtain. The attachment of the spring member to the curtain may be accomplished in any desirable manner, but, as shown in Figure 8, the handle portion is turned up at an angle, as at 37, and engaged with a clip or plate 38, which is in turn fastened to the inner side of the curtain by a button or plate 39 on the outer side of the curtain and having prongs inserted through the curtain and said clip or plate 38 and clinched upon the latter.

The stud member may, of course, be made and mounted in various ways according to the use thereof, and the socket member may also be attached to the material on which it is used in many different ways, as by sewing, riveting or otherwise. In the accompanying drawings, wherein the socket member is illustrated as applied to a flexible fabric or material, such as vehicle curtain or the like, the material is clamped between the roof plate 12 and an attaching plate 40, the latter having prongs 41 which are inserted through the material and alined slots 42, 43, respectively provided therefor in the roof plate 12 and floor plate 1, and then clinched against the floor plate. Obviously, this fastening plate admits of considerable modification within the spirit of the present invention, and therefore, is not limited to the exact structure shown in the drawings. So, too, the entire structure may be modified and changed within the terms of the appended claims.

What is claimed is:

1. A fastener including a clasp member and a stud member unitable therewith, the clasp member including a base plate having an aperture for the reception of said stud member and outwardly and upwardly sloping shoulders on opposite sides of said aperture, and spring members normally resting on said base plate and abutting said shoulders in cooperatively-opposed relation to each other and extending chordwise across the adjacent sides of said aperture, said stud member having a portion insertable through said aperture and being of a width greater than the normal distance between said spring members, the end portion of said stud member being tapered so as to enter wedge-like between said spring members and a portion adjacent being depressed so as to accommo-